United States Patent
Dillow et al.

(10) Patent No.: US 10,831,248 B2
(45) Date of Patent: Nov. 10, 2020

(54) MOBILE DEVICE TEMPERATURE-REGULATING CASE

(71) Applicant: ADESA, Inc., Carmel, IN (US)

(72) Inventors: Christopher Dillow, Carmel, IN (US); Cody Breeding, Terre Haute, IN (US)

(73) Assignee: ADESA, Inc., Carmel, IN (US)

( * ) Notice: Subject to any disclaimer, the term of this patent is extended or adjusted under 35 U.S.C. 154(b) by 0 days.

(21) Appl. No.: 15/975,342

(22) Filed: May 9, 2018

(65) Prior Publication Data

US 2019/0346893 A1  Nov. 14, 2019

(51) Int. Cl.
*G06F 1/20* (2006.01)
*A45C 11/00* (2006.01)
*G06F 1/16* (2006.01)
*H04M 1/02* (2006.01)

(52) U.S. Cl.
CPC .............. *G06F 1/203* (2013.01); *A45C 11/00* (2013.01); *G06F 1/1628* (2013.01); *H04M 1/0202* (2013.01); *A45C 2011/002* (2013.01)

(58) Field of Classification Search
CPC ........................................................ G06F 1/20
See application file for complete search history.

(56) References Cited

U.S. PATENT DOCUMENTS

| | | | |
|---|---|---|---|
| 5,704,212 A | 1/1998 | Erler | |
| 5,974,556 A | 10/1999 | Jackson | |
| 6,109,039 A | 8/2000 | Hougham | |
| 6,181,553 B1 | 1/2001 | Cipolla | |
| 6,191,943 B1 | 2/2001 | Tracy | |
| 6,219,233 B1 | 4/2001 | Moore | |
| 6,255,622 B1 | 7/2001 | May | |
| 6,256,193 B1 | 7/2001 | Janik | |

(Continued)

FOREIGN PATENT DOCUMENTS

| | | |
|---|---|---|
| CN | 201698310 U | 1/2011 |
| DE | 202017002990 U1 | 7/2017 |

(Continued)

OTHER PUBLICATIONS

X-Naut "Active Cooling Mounts for iPad" https://x-naut.com/collections/active-cooling-mounts-for-ipad (2 pages). Accessed Apr. 10, 2018.

(Continued)

*Primary Examiner* — Jerry Wu
(74) *Attorney, Agent, or Firm* — Lempia Summerfield Katz LLC

(57) ABSTRACT

A mobile device temperature-regulating case is disclosed. Mobile devices, such as tablet computers and smartphones, may be exposed to extreme temperatures, such as extreme cold and extreme heat. Under these extreme temperatures, the mobile devices may not function properly or at all. In that regard, the mobile device temperature-regulating case is configured to at least partially encase a side of the mobile device and conductively cool and/or heat the side of the mobile device. For example, a solid-state heat pump may conductively cool the side of the mobile device, with a fan convectively cooling the solid-state heat pump. In this way, temperature of the mobile device may be kept less than or greater than a predetermined temperature so that the mobile device may function properly.

9 Claims, 18 Drawing Sheets

(56) References Cited

U.S. PATENT DOCUMENTS

| | | |
|---|---|---|
| 6,276,448 B1 | 8/2001 | Maruno |
| 6,313,987 B1 | 11/2001 | Oconnor |
| 6,362,959 B2 | 3/2002 | Tracy |
| 6,415,612 B1 | 7/2002 | Pokharna |
| 6,459,574 B1 | 10/2002 | Ghosh |
| 6,605,924 B2 | 8/2003 | Tanaka |
| 6,687,123 B2 | 2/2004 | Kitahara |
| 6,837,057 B2 | 1/2005 | Pokharna |
| 6,837,058 B1 | 1/2005 | Mceuen |
| 6,856,921 B2 | 2/2005 | Cohen |
| 7,472,215 B1 | 12/2008 | Mok |
| 7,660,930 B2 | 2/2010 | Mok |
| 7,676,619 B2 | 3/2010 | Mok |
| 7,676,620 B2 | 3/2010 | Mok |
| 7,694,057 B2 | 4/2010 | Mok |
| 7,702,837 B2 | 4/2010 | Mok |
| 7,711,884 B2 | 5/2010 | Mok |
| 7,739,439 B2 | 6/2010 | Mok |
| 7,761,641 B2 | 7/2010 | Mok |
| 7,788,436 B2 | 8/2010 | Mok |
| 7,793,027 B2 | 9/2010 | Mok |
| 7,843,691 B2 | 11/2010 | Reichert |
| 7,925,813 B2 | 4/2011 | Mok |
| 7,974,090 B2 | 7/2011 | Risher-kelly |
| 9,300,342 B2 | 3/2016 | Schlub |
| 9,836,101 B1 | 12/2017 | Saravis |
| 9,921,618 B2 | 3/2018 | Magi |
| 10,007,298 B2 | 6/2018 | Shibayama |
| 10,409,342 B2 | 9/2019 | Saravis |
| 2001/0007525 A1 | 7/2001 | Tracy |
| 2001/0033475 A1 | 10/2001 | Lillios |
| 2004/0130870 A1 | 7/2004 | Fleck |
| 2005/0217278 A1 | 10/2005 | Mongia |
| 2013/0135214 A1 | 5/2013 | Li |
| 2013/0235521 A1 | 9/2013 | Burch |
| 2014/0062392 A1 | 3/2014 | Lofy |
| 2014/0098486 A1 | 4/2014 | Davis |
| 2014/0192480 A1 | 7/2014 | Winkler |
| 2015/0192971 A1 | 7/2015 | Shah |
| 2017/0168531 A1 | 6/2017 | Casparian |
| 2017/0273214 A1 | 9/2017 | Casparian |
| 2018/0081409 A1 | 3/2018 | Saravis |
| 2018/0239404 A1* | 8/2018 | Siddiqui ............... G06F 1/1632 |
| 2018/0307284 A1 | 10/2018 | Saravis |

FOREIGN PATENT DOCUMENTS

| | | |
|---|---|---|
| GB | 2524248 A | 9/2015 |
| WO | WO2018222720 A1 | 12/2018 |

OTHER PUBLICATIONS

X-Naut "When Every Mission is Critical: Active Cooling Mount for iPad" https://x-naut.com (6 pages). Accessed Apr. 10, 2018.

X-Naut "Frequently Asked Questions X-Naut iPad Cooling System" https://x-naut.com/pages/faq-questions-about-xnaut (7 pages). Accessed Apr. 10, 2018.

X-Naut "Other Collection" https://x-naut.com/collections/other-collection (4 pages). Accessed Apr. 10, 2018.

PCT International Search Report for corresponding PCT/US2019/030313, dated Aug. 16, 2019.

PCT Written Opinion of the International Searching Authority dated Aug. 16, 2019, for corresponding PCT/US2019/030313.

Gurrum, et al., "Generic Thermal Analysis for Phone and Tablet Systems", In Proceedings of IEEE 62nd Electronic Components and Technology Conference, May 29, 2012, pp. 1488-1492.

* cited by examiner

MOBILE DEVICE TEMPERATURE-REGULATING CASE

BACKGROUND

Mobile devices, such as tablets (e.g., iPads®) or smartphones, may be used in a variety of environments, such as in extreme cold environments and in extreme warm environments. Operation of the mobile devices in such extreme environments may negatively affect the performance of the mobile device to the point where the mobile device may become inoperable.

DETAILED DESCRIPTION

Figure 1:
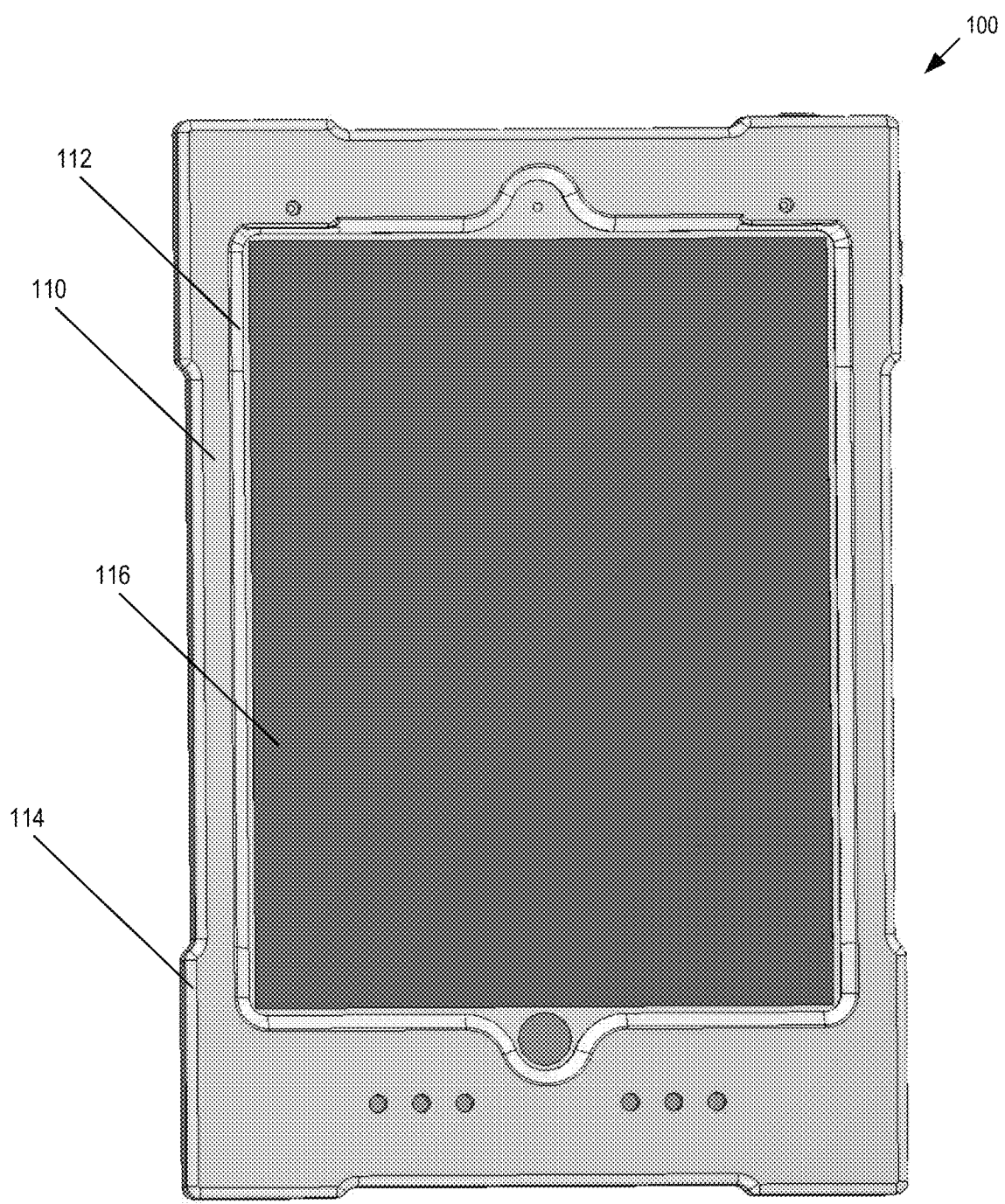
FIG. 1 illustrates a front view of the mobile device temperature regulating case.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Mobile devices may be operated in a variety of environments, such as in extremely hot environments and extremely cool environments. Examples of mobile devices include, but are not limited to, tablet computers (e.g., iPad® tablet), smartphones (e.g., iPhone® smartphone), or the like. In such extreme environments, particularly when the mobile devices do not have cooling systems resident therein, the mobile devices may be adversely affected to the point of shutting down. For example, in extreme heat, the mobile devices may overheat to the point of the mobile device stops functioning properly. As another example, in extreme cold, the performance of the rechargeable batteries in the mobile device may degrade to the point where battery life is severely affected.

In one implementation, a mobile device case that covers part or all of one or more sides of the mobile devices is disclosed. The mobile device case is configured to regulate the temperature of the mobile device, such as to cool the mobile device (in the instance of extreme heat) and/or to heat the mobile device (in the instance of extreme cold). In a specific implementation, the mobile device case includes a solid-state heat pump to conductively cool a surface of the mobile device, and a fan to convectively cool the solid-state heat pump. For example, the solid-state heat pump may comprise a Peltier device, which includes a cooler side and a warmer side. The cooler side of the Peltier device conductively cools the surface of the mobile device, being in thermal contact with the surface of the mobile device, such as directly contacting the exterior surface of the mobile device or contacting the exterior surface of the mobile device via an intermediate metal film. The warmer side of the Peltier device has a heat sink connected thereto. In practice, the fan convectively cools the heat sink and the warmer side of the Peltier device.

In one implementation, the mobile device case includes a single temperature control device (such as a single cooling device or a single heating device). Alternatively, the mobile device case includes a plurality of temperature control devices. In a first specific implementation, each of the plurality of temperature control devices is individually controllable. In a second specific implementation, the plurality of temperature control devices are controllable in combination. Further, the temperature control devices may each be cooling devices, may each be heating devices, or may be a combination of cooling and heating devices. For example, the mobile device case may include a heating device to be positioned in between multiple cooling devices such that each of the heating device and multiple cooling devices are positioned to conductively cool an exterior of the mobile device.

The mobile device case may include a housing that forms a duct through which air may flow, thereby convectively cooling the temperature control device. For example, the housing may include holes on two opposing sides, defining a duct therebetween. Further, a fan may be positioned within the housing such that the fan outlets are on a side of the housing that is between the two opposing sides. In this way, the duct may server to channel air through the mobile device case in order to cool the heat sink and cooling devices.

In one implementation, the housing on the mobile device case may further connect to a removable battery cover. Specifically, the housing may include an inner surface and an outer surface. The inner surface includes an opening through which a temperature control device (such as a cooling or heating device) may convectively cool the exterior surface of the mobile device. The outer surface, which is opposing the inner surface, includes a latch for a battery cover. In this way, the battery cover may latch to the outer surface of the housing, thereby enclosing a rechargeable battery within a battery pocket of the mobile device case. Further, the battery cover may unlatch from the part of the housing so that the rechargeable battery is removable from the housing.

Referring to the figures, FIG. 1 illustrates a front view of the mobile device temperature regulating case 100. The mobile device temperature regulating case 100 may be connected to the mobile device in one of several ways. In one way, the mobile device may be pressed fit into the mobile device temperature regulating case 100 may be pressed-fit. Alternatively, or in addition, the mobile device temperature regulating case 100 may be screwed or bolted to the mobile device. The mobile device temperature regulating case 100 includes a front portion 110, an inner ridge 112 and corner members 114. The inner ridge 112 may travel along the entire perimeter of screen 116 of mobile device. Alternatively, the inner ridge 112 may travel along less than the entire perimeter of screen 116 of mobile device. Further, corner members 114 may be positioned at each of the 4 corners, such as illustrated in FIG. 1. Alternatively, corner members 114 may be positioned at less than all of the 4 corners. The inner ridge 112 may be composed of rubber, whereas other sections, such as front portion 110, and back portion, 214 (discussed below), may be composed of a more rigid structure, such as injection-molded plastic.

Figure 2A:
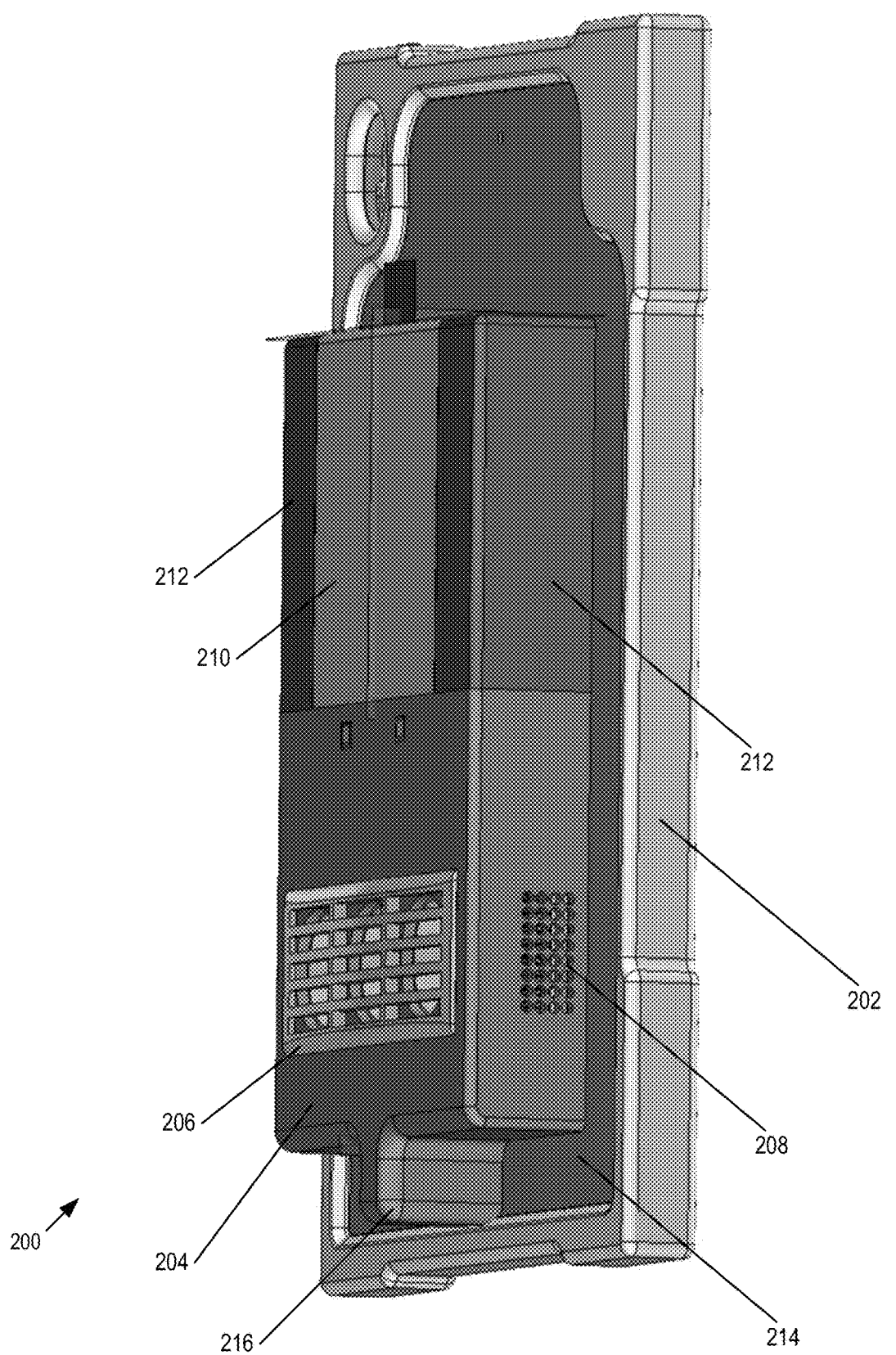
FIG. 2A illustrates a first example of a back perspective view of the mobile device temperature regulating case of FIG. 1.
Figure 3:
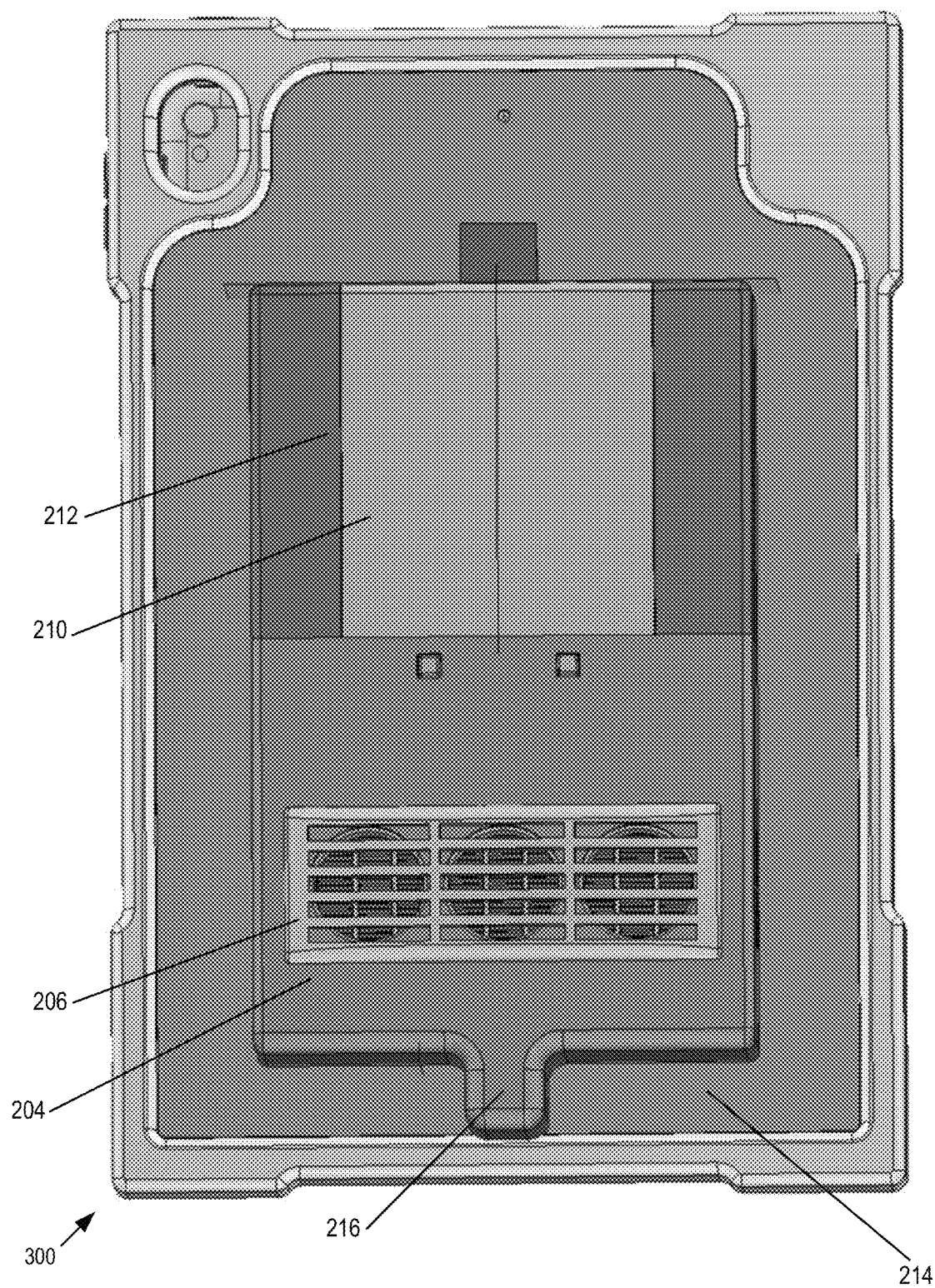
FIG. 3 illustrates a back view of the mobile device temperature regulating case of FIG. 1.
Figure 4A:
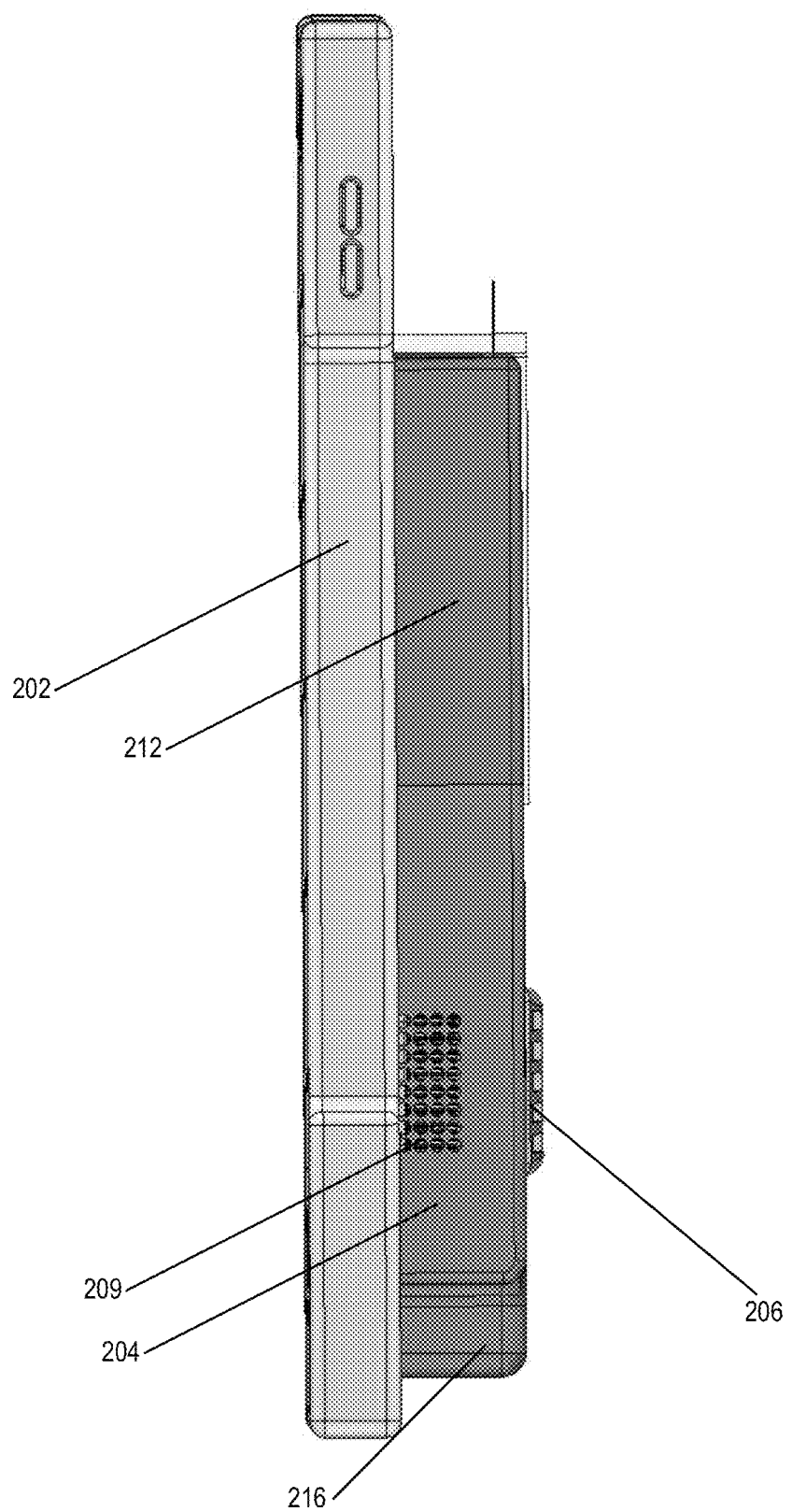
FIG. 4A illustrates a left side view of the mobile device temperature regulating case of FIG. 1.
Figure 4B:
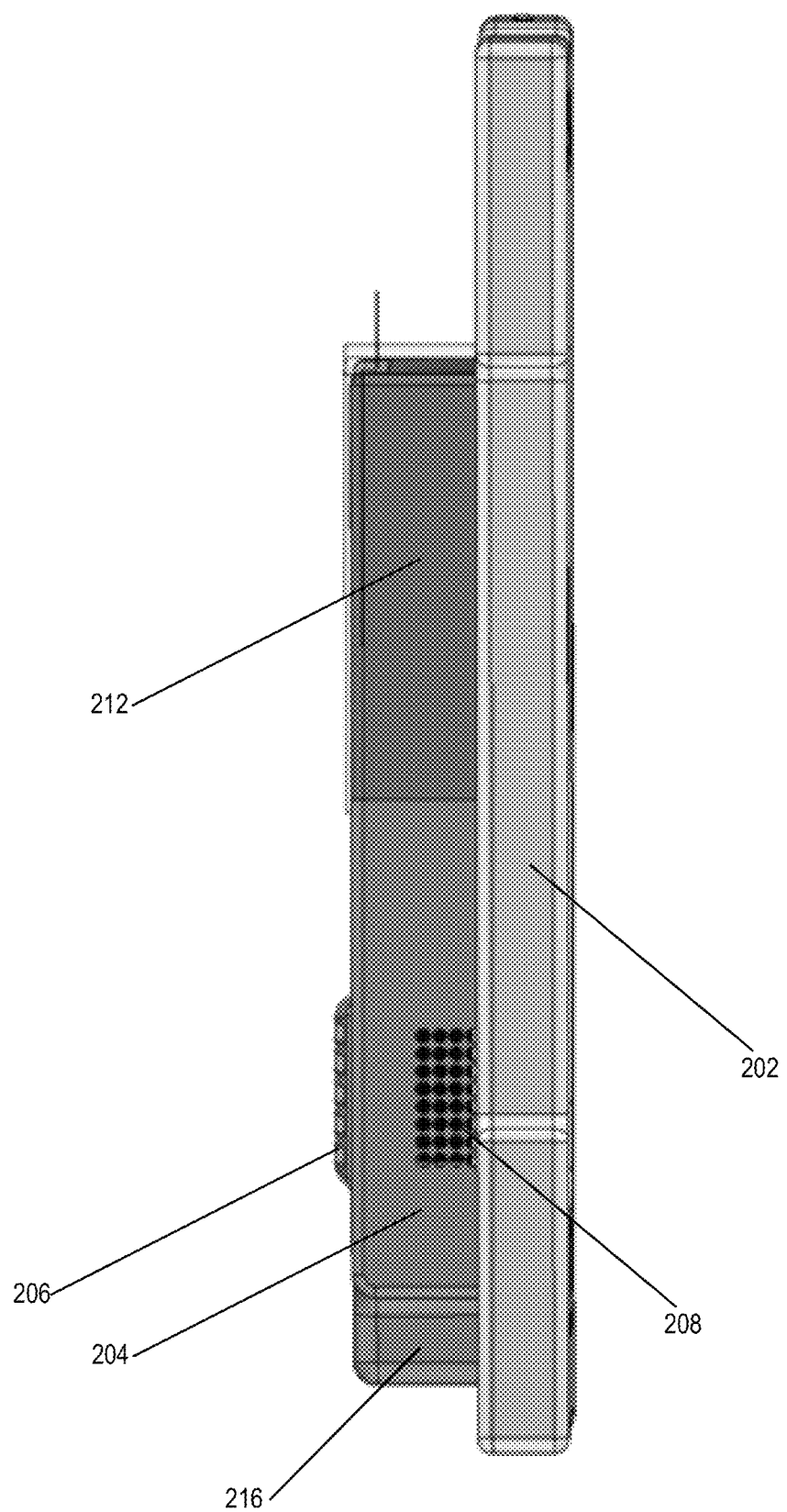
FIG. 4B illustrates a right side view of the mobile device temperature regulating case of FIG. 1.

FIG. 2A illustrates a first example of a back perspective view 200 of the mobile device temperature regulating case 100 of FIG. 1. FIG. 3 illustrates a back view 300 of the mobile device temperature regulating case 100 of FIG. 1. FIGS. 4A and 4B illustrates a left side view and right side view, respectively, of the mobile device temperature regulating case 100 of FIG. 1. Mobile device temperature regulating case 100 includes side 202, which may cover each of four sides of the mobile device, and back 214, which may cover at least part of the back of the mobile device.

Mobile device temperature regulating case 100 further includes jutting portion, which may comprise temperature control housing 204 and battery housing 212. Jutting portion may protrude from back of the mobile device and from back 214 of mobile device temperature regulating case 100. Temperature control housing 204 includes left side holes 208, right side holes 209, extension piece 216, and grille 206. Extension piece is configured to protect a connector, such as a USB connector, on the mobile device temperature regulating case 100 in order to electrically connect with an opposing USB connector on the mobile device (e.g., another USB connector on the mobile device configured to mate the USB connector on the mobile device temperature regulating case 100). Grille 206 is configured to protect one or more fans within temperature control housing 204. Battery housing 212 is configured to interface, such as snap or latch, with battery cover 210. Temperature control housing 204 and battery housing 212 may be two separate structures. Alternatively, temperature control housing 204 and battery housing 212 may be a single unitary piece.

Figure 2B:
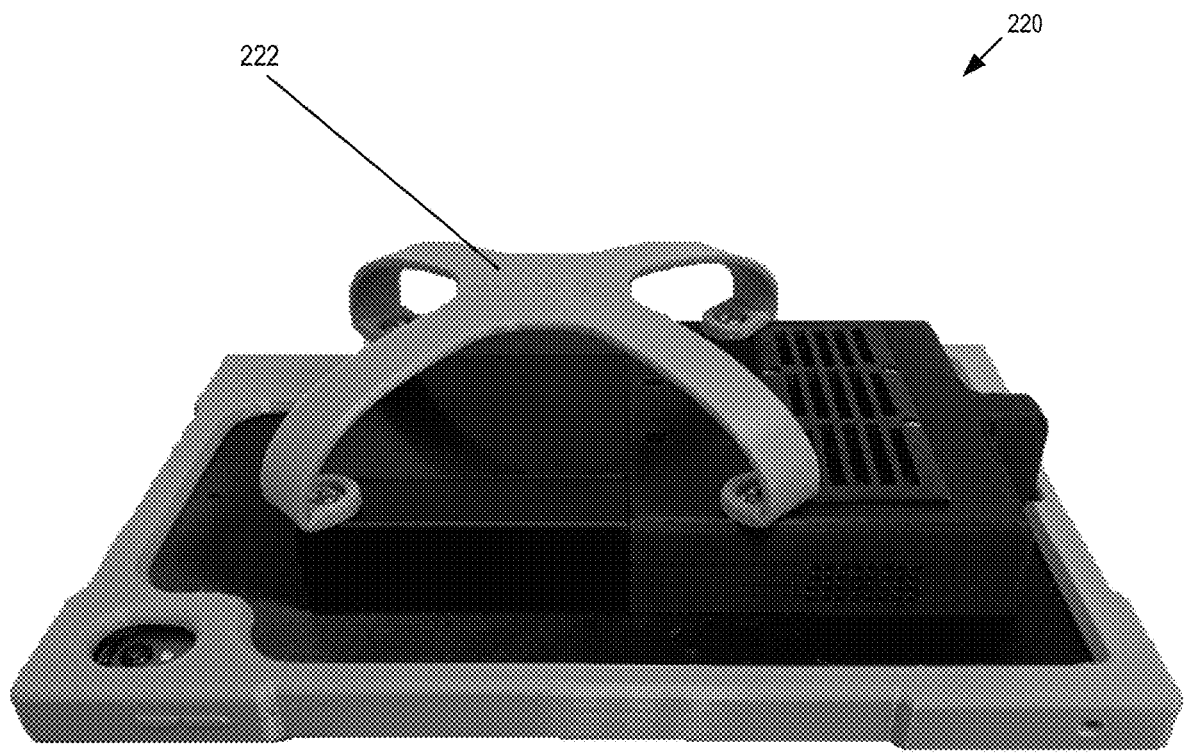
FIG. 2B illustrates a second example of a back perspective view of the mobile device temperature regulating case of FIG. 1.

FIG. 2B illustrates a second example of a back perspective view 220 of the mobile device temperature regulating case 100 of FIG. 1. The mobile device temperature regulating case 100 may include a strap 222 that is connected to (e.g., screwed to) both the battery housing and the temperature control housing. Strap 222 may bow out from the battery housing and the temperature control housing and may be configured for a user to hold the mobile device temperature regulating case 100.

Figure 5A:
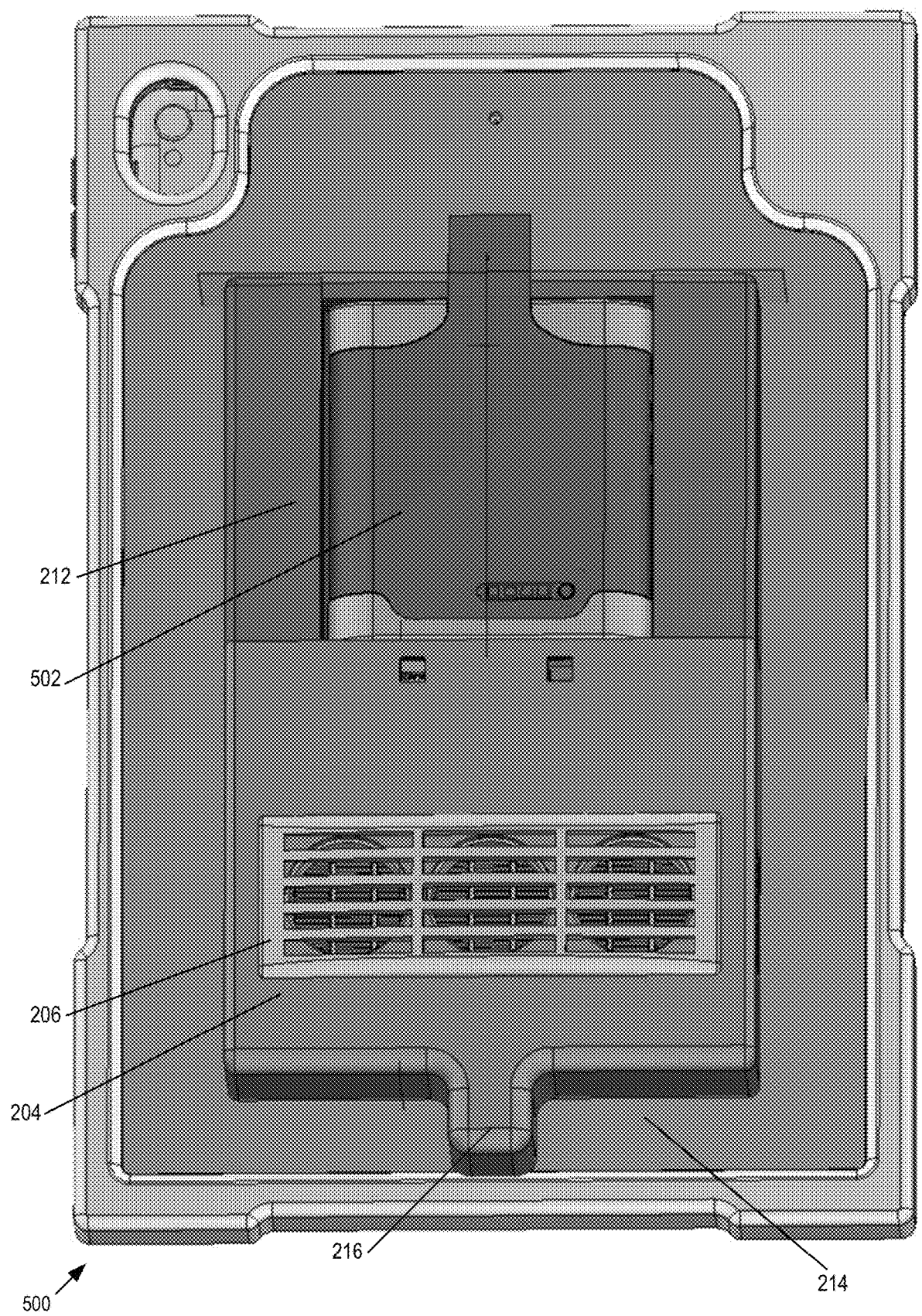
FIG. 5A illustrates the back view of the mobile device temperature regulating case of FIG. 3 with the battery door removed.

FIG. 5A illustrates the back view 500 of the mobile device temperature regulating case 100 of FIG. 3 with the battery cover 210 removed. Specifically, with the battery cover 210 removed, battery 510 is shown. As discussed above, battery cover 210 is configured to latch to at least a part of the housing, such as to battery housing 212 and/or to temperature control housing 204, such that in the latched position, the battery cover 210 closes the rechargeable battery in the housing and such that in the unlatched position, the battery cover is movable (e.g., slideable) in order to remove the rechargeable battery from the housing.

Figure 5B:
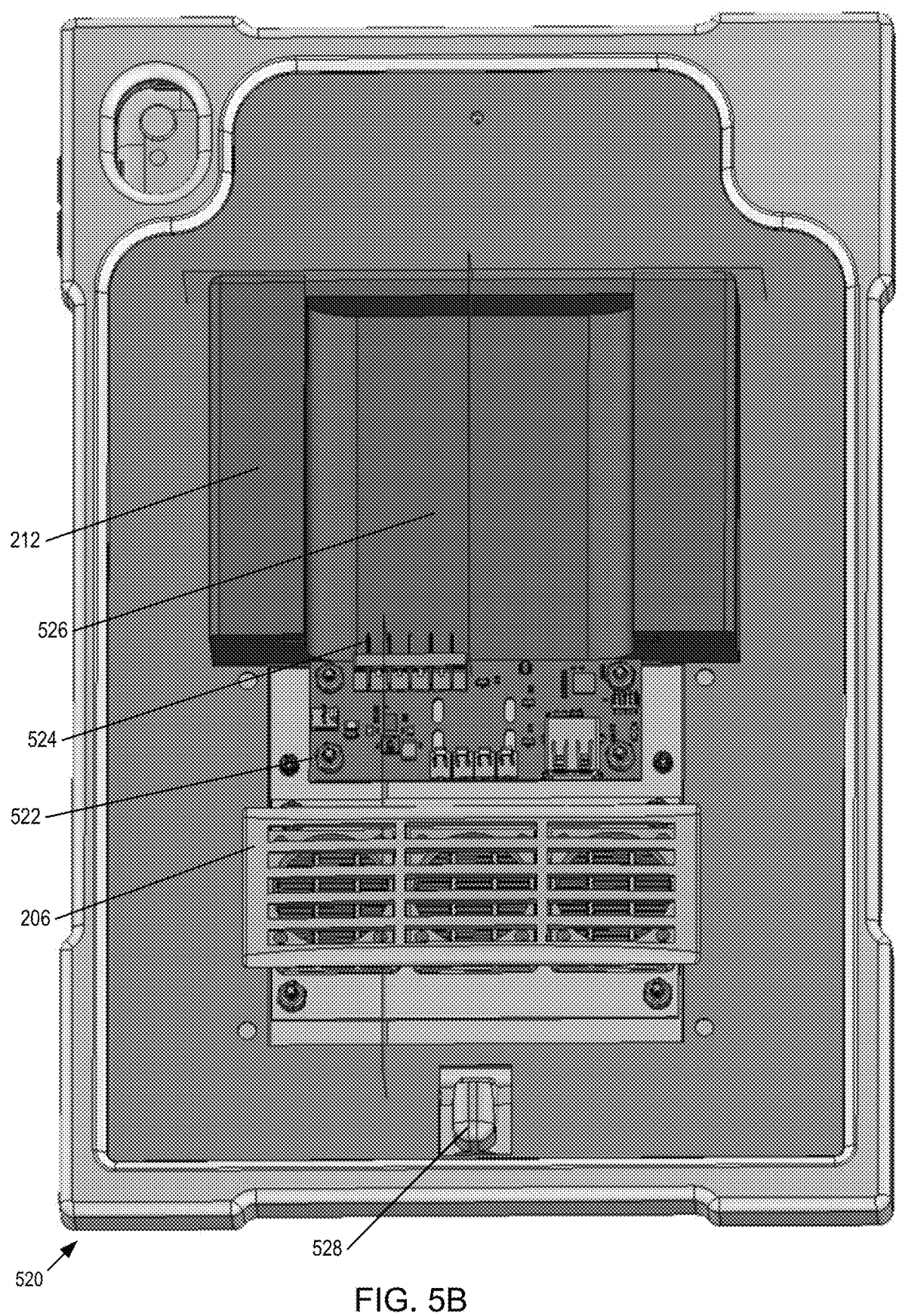
FIG. 5B illustrates the back view of the mobile device temperature regulating case of FIG. 3 with the battery door removed.

FIG. 5B illustrates the back view 520 of the mobile device temperature regulating case 100 of FIG. 3 with the battery cover 210, the battery 510, and the temperature control housing 204 removed. With battery 510 and temperature control housing 204 removed, battery pocket 526 and circuit board 522 are shown. Battery pocket 526 is shaped to receive a rechargeable battery, such as battery 510, such that when the rechargeable battery is inserted in the battery pocket 526, the rechargeable battery contacts one or more leads 524 on circuit board 522. FIG. 5B further illustrates connector 528, which is configured to connect to a port on the mobile device.

Thus, the mobile device temperature regulating case 100 may be powered by interchangeable rechargeable batteries. In practice, a user may remove one rechargeable battery from the mobile device temperature regulating case 100 and insert another rechargeable battery that has been recharged. In one implementation, the rechargeable batteries may be removed from the mobile device temperature regulating case 100 and recharged in a gang-charger. In another implementation, the rechargeable battery may be recharged, while still inserted in the mobile device temperature regulating case 100, when the mobile device temperature regulating case 100 is docked in a recharging station. Thus, the battery swapping capability may be used in combination with, or separately from, the temperature regulating capability of the mobile device temperature regulating case 100.

Figure 6A:
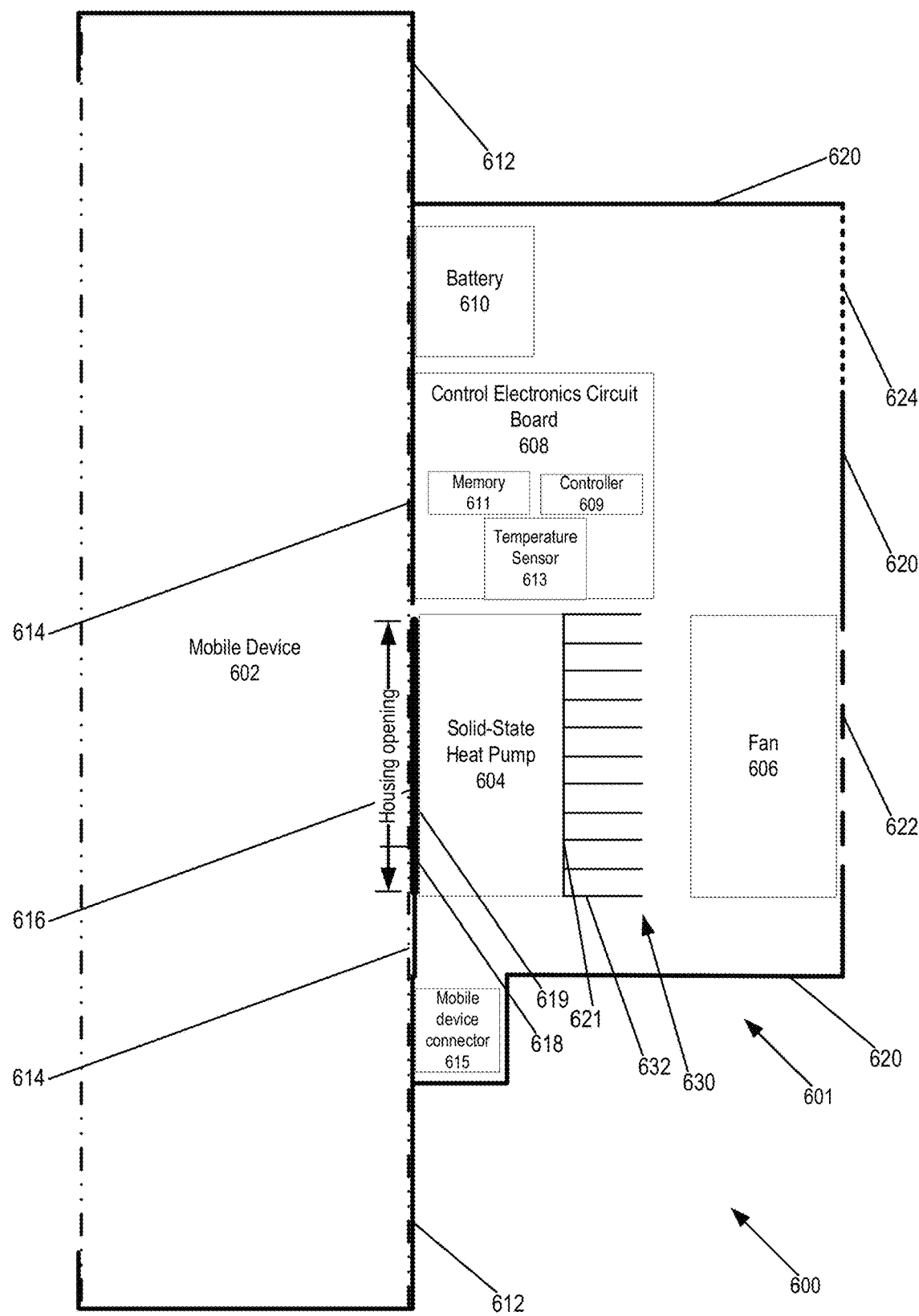
FIG. 6A illustrates a cross-sectional side view of the mobile device temperature regulating case and the mobile device.

FIG. 6A illustrates a cross-sectional side view 600 of the mobile device temperature regulating case 601 and the mobile device 602. The mobile device temperature regulating case 601 may be composed of one or more housing structures, such as housing 612, housing 614, and housing 620. Housing 612 is configured to contact one or more exterior sides of mobile device 602, such as illustrated in FIG. 6A. Housing 620 is configured to house fan 606, solid-state heat pump 604, heat sink 630, control electronics circuit board 608, and battery 610. Housing 614 is configured to contact at exterior surface of mobile device 602 which is covered by housing 620. In one implementation, housing 614 is a unitary piece with housing 612, with housing 620 being bolted to one or both of housing 612, 614. In another implementation, housing 614 is a unitary piece with housing 620, being bolted to housing 612. In still another implementation, housing 614 is a piece separate from housing 612 and housing 620, and is connected to one or both of housing 612 and housing 620.

Housing 614 includes housing opening 616. Housing opening 616 is shaped such that a cooling surface 619 of the solid-state heat pump 604 faces housing opening 616. Specifically, cooling surface 619 is covered with metal surface 618 in order to more evenly distribute cooling to the exterior surface of mobile device 602. In one implementation, metal surface 618 is composed of aluminum. Other types of metals are contemplated for metal surface 618. Metal surface 618 faces, and is optionally flush with, housing opening 616. Specifically, in one implementation, there is no air gap between metal surface 618 and exterior surface of mobile device 602 so that heat is pulled directly the exterior back surface of mobile device 602 through metal surface 618 to the cooling surface 619 of the solid-state heat pump 604. In this way, metal surface 618 may physically contact exterior surface of mobile device 602.

Housing 620 may further connect with grille 622 and battery cover 624. Grille 622 may protect fan 606 while allowing air flow therethrough. Further, heat sink 630 may include one or more fins 632 in order to disperse heat from hot surface (e.g., side 621) of the solid-state heat pump 604.

Control electronics circuit board 608 includes controller 609, memory 611, temperature sensor 613, and mobile device connector 615. Controller 609, which may work in combination with memory 611 and temperature sensor 613, is configured to control the various electronics in the mobile device temperature regulating case. The controller may include embedded memory and/or interact with external memory, and can take one of several forms, one of which is a processor 1002 and memory (e.g., main memory 1004, a static memory 1006) illustrated in FIG. 10, with other forms including processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller can be configured with hardware and/or firmware to perform the various functions described below and shown in the flow diagrams.

Temperature sensor 613 may comprise a thermistor, a thermocouple, or the like. For example, flow diagrams 9A-B may be implemented via controller 609 in order to control solid-state heat pump 604 and fan 606. Mobile device connector 615 may comprise a mechanical connector to the mobile device 602, such as a USB connector to the mobile device 602. Mobile device connector, though illustrated in FIG. 6A as positioned separate from control electronics circuit board 608, communicates with control electronics circuit board 608 (such as sending power from battery 610, via control electronics circuit board 608, to the mobile device 602). In one implementation, the mobile device temperature regulating case 601 may be configured to charge the mobile device 602, such as charging the mobile device 602 using battery 610 via mobile device connector 615. In this regard, in one implementation, battery 610 may power the electronics resident in mobile device temperature regulating case 601 (such as solid-state heat pump 604 and fan 606) and recharge the mobile device 602.

Figure 6B:
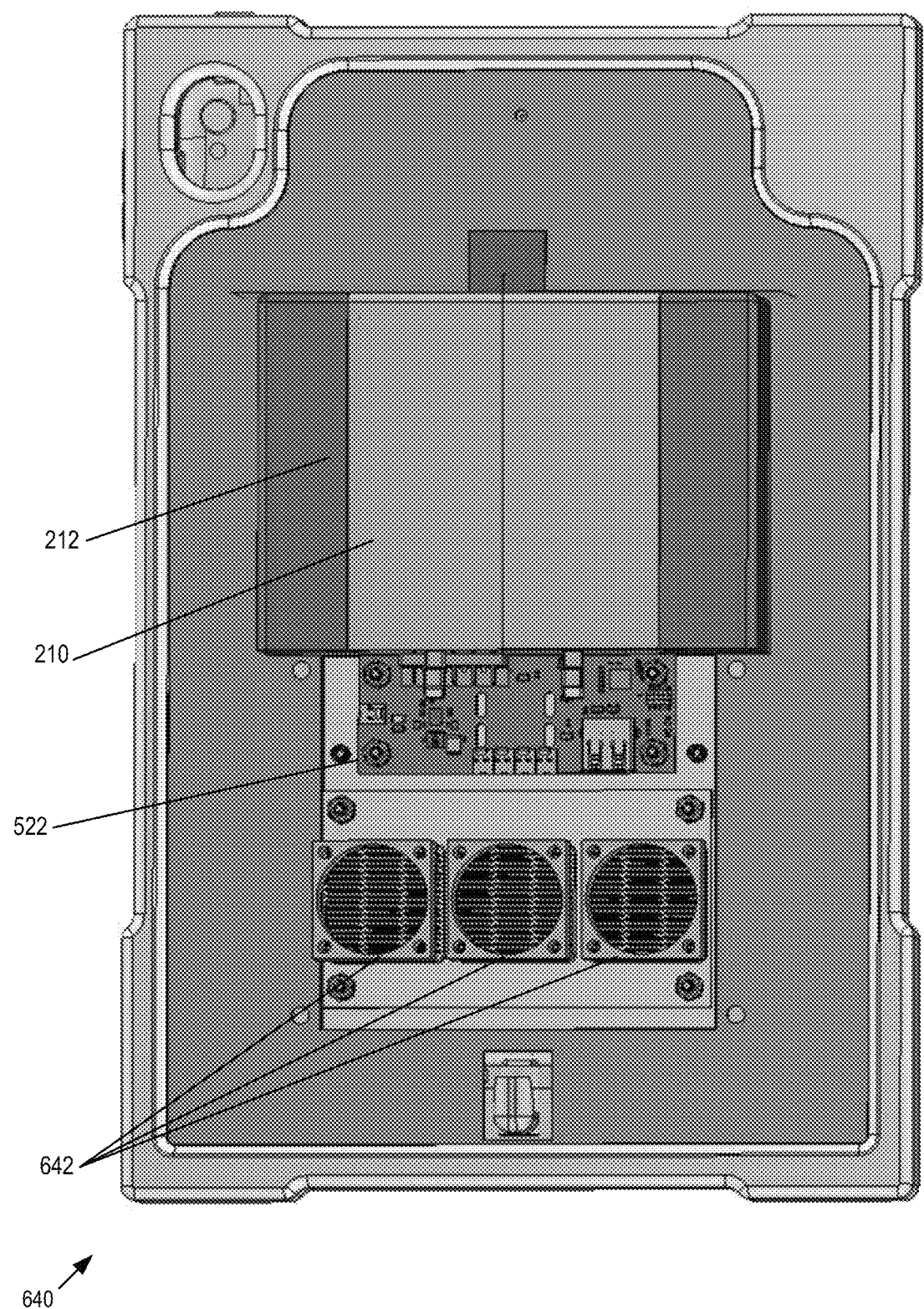
FIG. 6B illustrates the back view of the mobile device temperature regulating case of FIG. 3 with the temperature control housing and the grille removed.

FIG. 6B illustrates the back view 640 of the mobile device temperature regulating case 100 of FIG. 3 with the temperature control housing 204 and grille 206 removed. As shown, there are three fans 642, each configured to convectively cool a respective Peltier cooling device, as discuss in further detail below. The three fans 642 include fan outlets, which are illustrated in FIG. 6B as facing outward. In this way, the number of solid-state heat pumps may be equal to the number of fans, with each fan being coaxial with its respective solid-state heat pump.

Figure 6C:
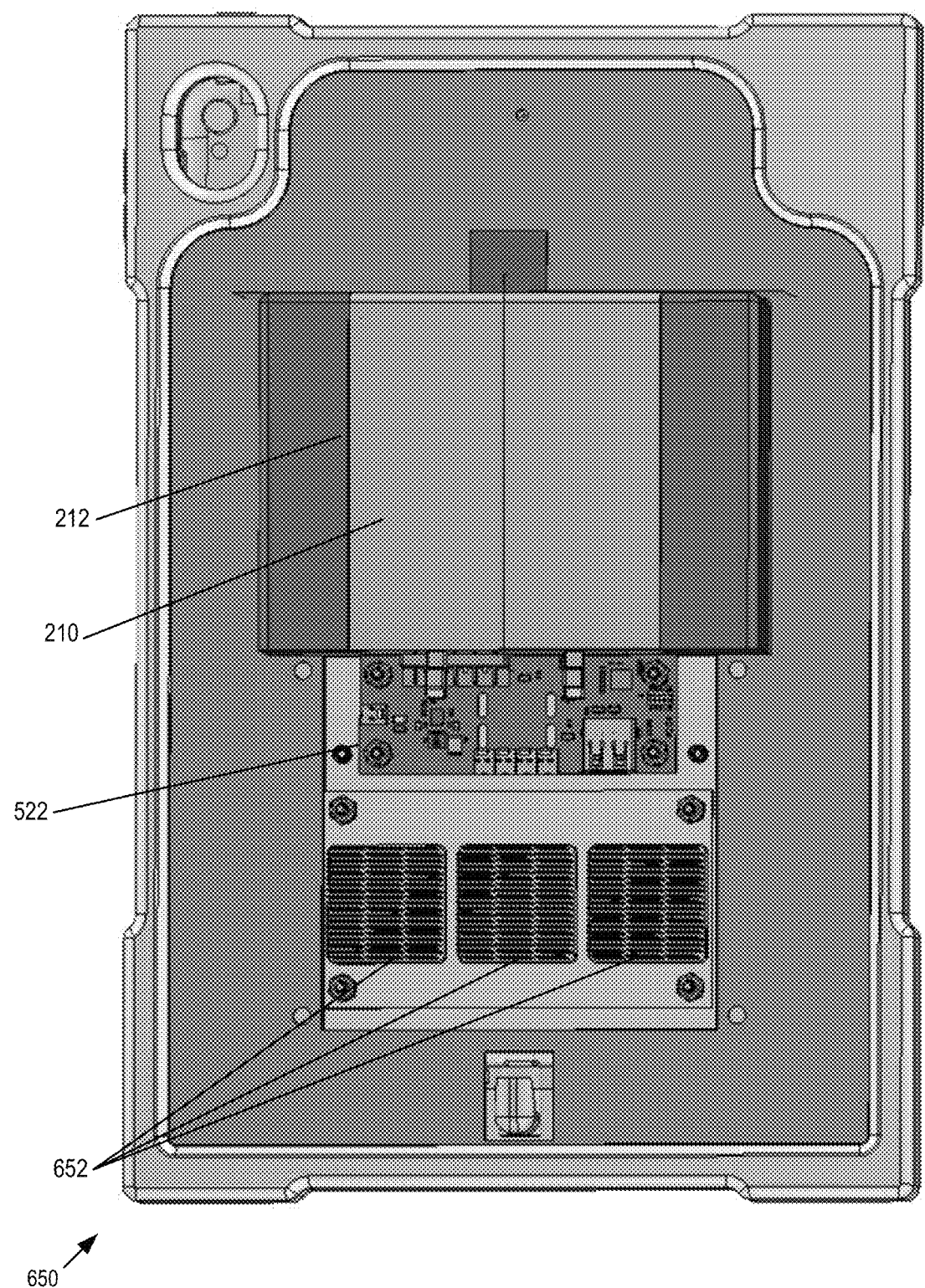
FIG. 6C illustrates the back view of the mobile device temperature regulating case of FIG. 3 with the upper portion of the housing, the fan grille, and the fans removed.

FIG. 6C illustrates the back view 650 of the mobile device temperature regulating case 100 of FIG. 3 with the temperature control housing 204, the grille 206, and the fans 642 removed. Fins 652, which are a part of heat sinks, are shown. In one implementation, a heat sink may be positioned respective to each of the Peltier cooling device. As discussed further below, multiple Peltier cooling devices may be used. In this regard, a fan and heat sink may be positioned to cool the respective Peltier cooling device.

Figure 6D:
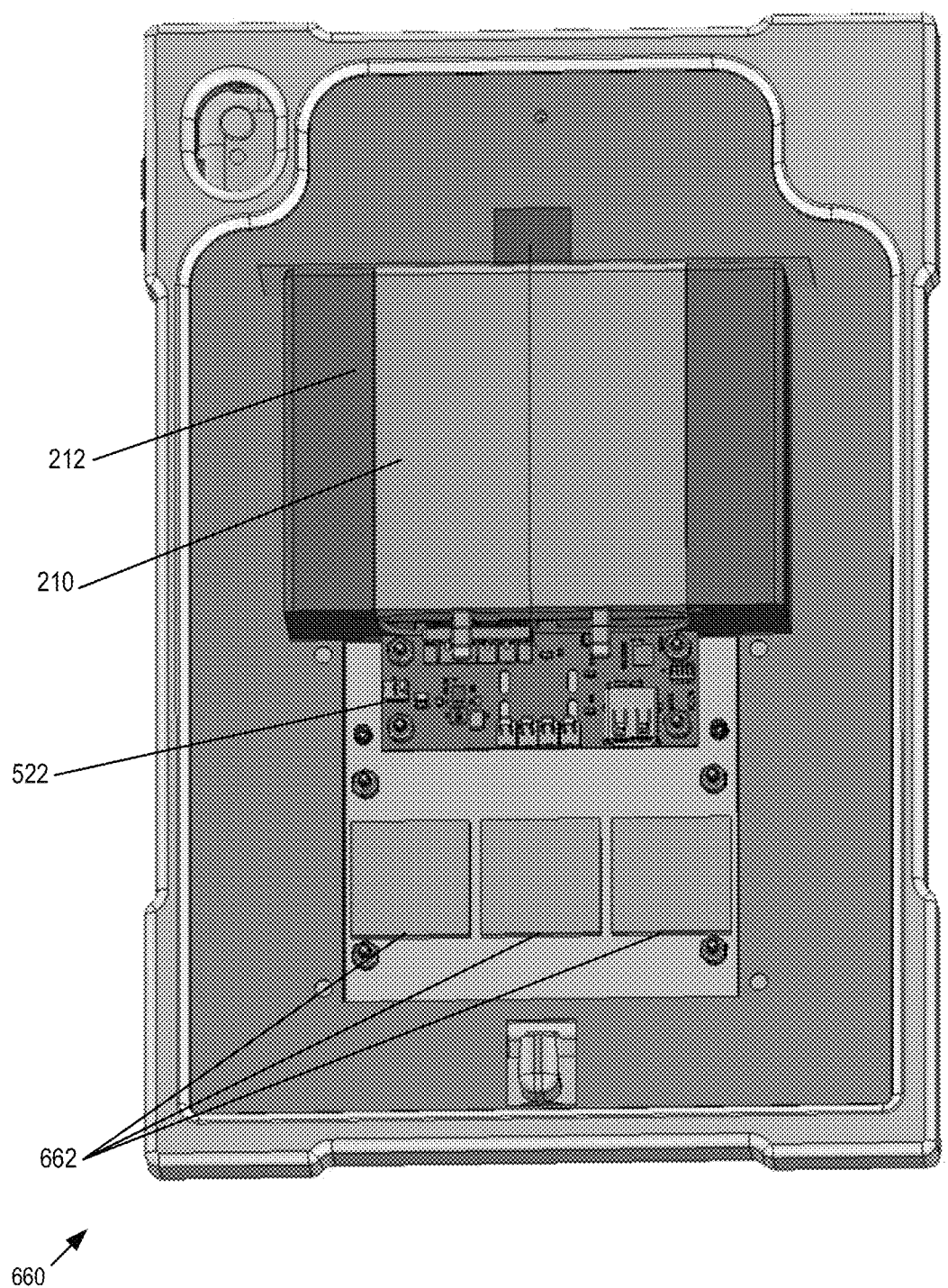
FIG. 6D illustrates the back view of the mobile device temperature regulating case of FIG. 3 with the upper portion of the housing, the fan grille, the fans, and the fins removed.

FIG. 6D illustrates the back view 660 of the mobile device temperature regulating case 100 of FIG. 3 with the temperature control housing 204, the grille 206, the fans 642, and the fins 652 removed. Peltier cooling devices 662 are illustrated. Thus, fan 642 and fin 652 may be positioned to be coaxial with the respective Peltier cooling device 662. Further, FIG. 6D illustrated three Peltier cooling devices 662. Fewer or greater numbers of Peltier cooling devices 662 are contemplated. For example, in one implementation, a single Peltier cooling device is used. In another implementation, two Peltier cooling devices are used.

Figure 7:
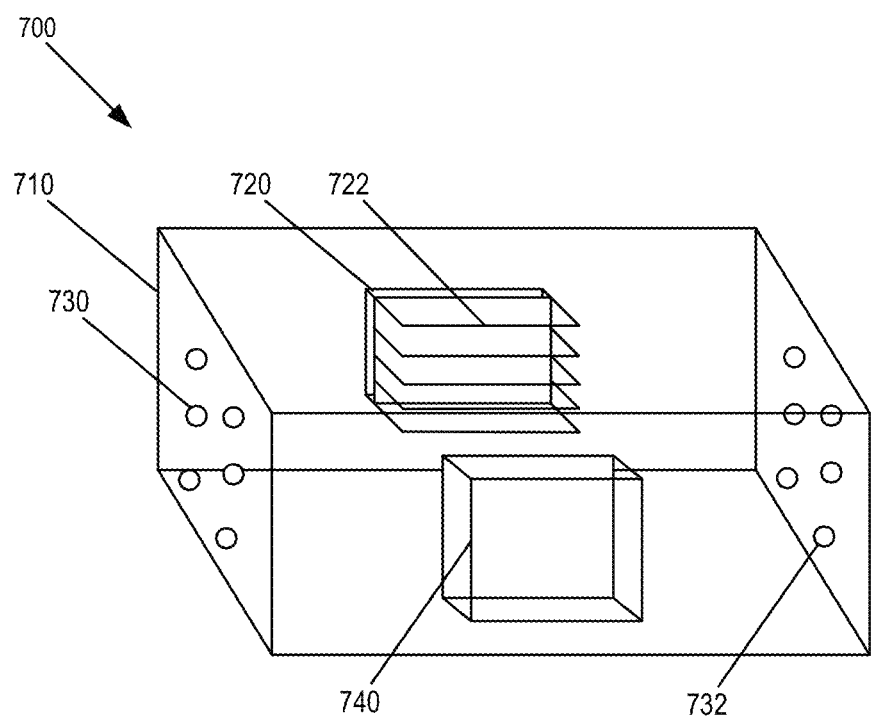
FIG. 7 illustrates a 3-dimensional representation of the duct between the air outlets of the housing for the mobile device temperature regulating case.

FIG. 7 illustrates a 3-dimensional representation 700 of the duct between the air outlets 730, 732 of the housing 710 for the mobile device temperature regulating case. As shown, a channel or duct may be formed between air outlets 730, 732 inside housing 710. In practice, the ducted air may pull the heat away from heat sink 722. Housing includes temperature regulating device 720, heat sink 722 and fan 740.

Figure 8A:
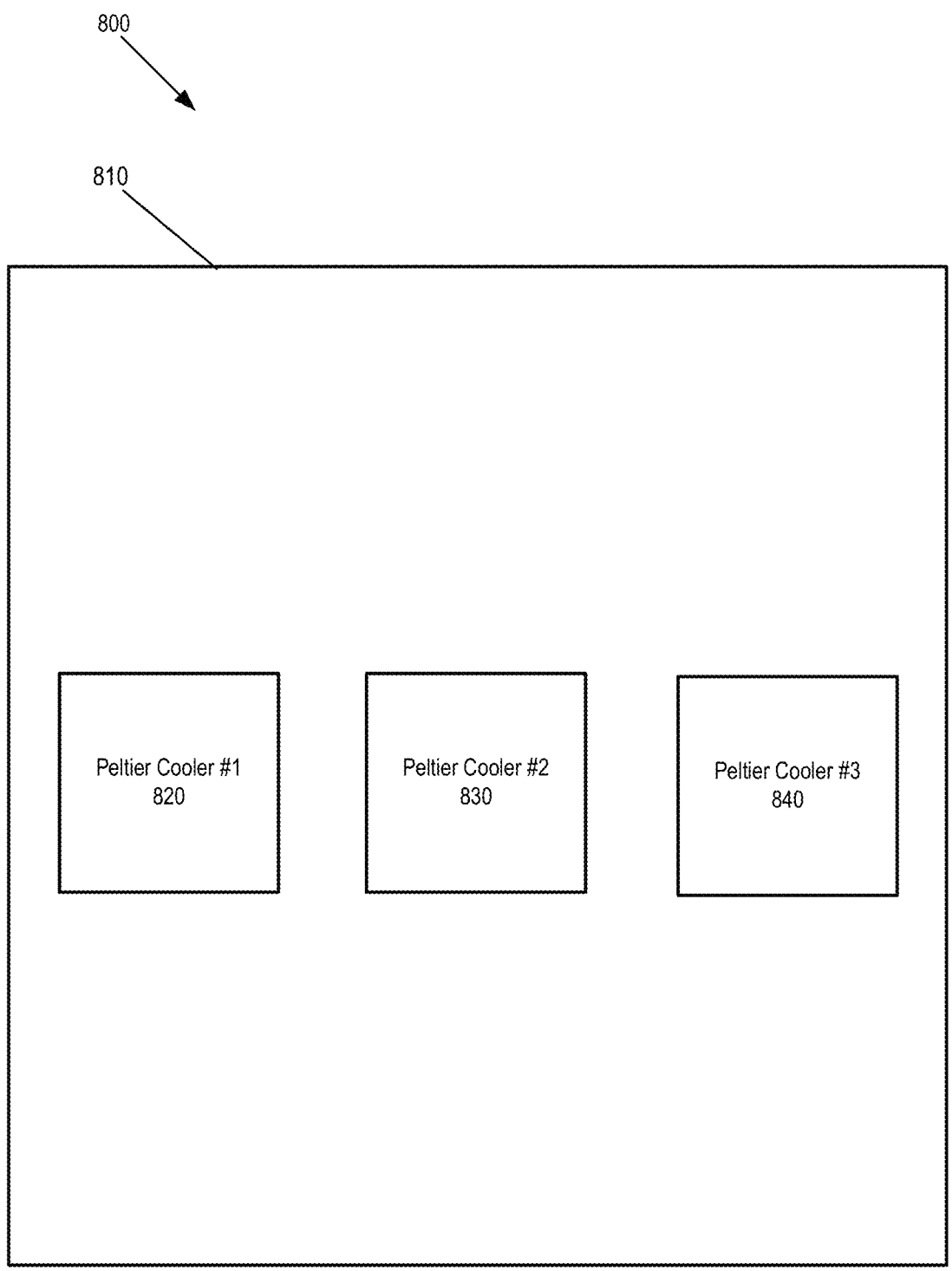
FIG. 8A illustrates the layout of multiple Peltier cooling devices for the mobile device temperature regulating case.

FIG. 8A illustrates the layout 800 of multiple Peltier cooling devices 820, 830, 840 for the mobile device temperature regulating case. As shown, the Peltier cooling devices 820, 830, 840 are positioned on a support backing 810 so that the cooling may be distributed across different portions of the exterior of the mobile device. The cooling surface area of the Peltier cooling device may be 1 inch squared and may be distributed so that the cooling of the exterior surface of the mobile device is likewise distributed. The control electronics, such as control electronics circuit board 608, may include separate control channels, such as pulse width modulation channels, to control the respective Peltier cooling device. Thus, three separate modulation channels may be used to control the Peltier cooling devices 820, 830, 840. Further, in one implementation, the control of the Peltier cooling devices 820, 830, 840 may be identical, such as operating the Peltier cooling devices 820, 830, 840 at the same capacity (e.g., at the same percentage capacity, such as at 50% of the rated capacity, at 40% of the rated capacity, at 30% of the rated capacity, etc.). In an alternate implementation, the control of the Peltier cooling devices 820, 830, 840 may be different, such that the Peltier cooling devices 820, 830, 840 operate at different capacities (e.g., Peltier cooling device 820 operates at 70% of the rated capacity whereas at Peltier cooling devices 830, 840 operate at 40% of the rated capacity). Thus, in one implementation, the control of the Peltier cooling devices 820, 830, 840 may be such that they are all operated at greater than 0% capacity but less than 100% capacity. In an alternate implementation, the control of the Peltier cooling devices 820, 830, 840 may be such that they are all operated at 100% capacity. In still an alternate implementation, the control of the Peltier cooling devices 820, 830, 840 may be such that one or more are operated at 0% capacity but a remaining one (or ones) are operated at greater than 0% capacity (e.g., at less than 100% capacity or at 100% capacity).

Figure 8B:
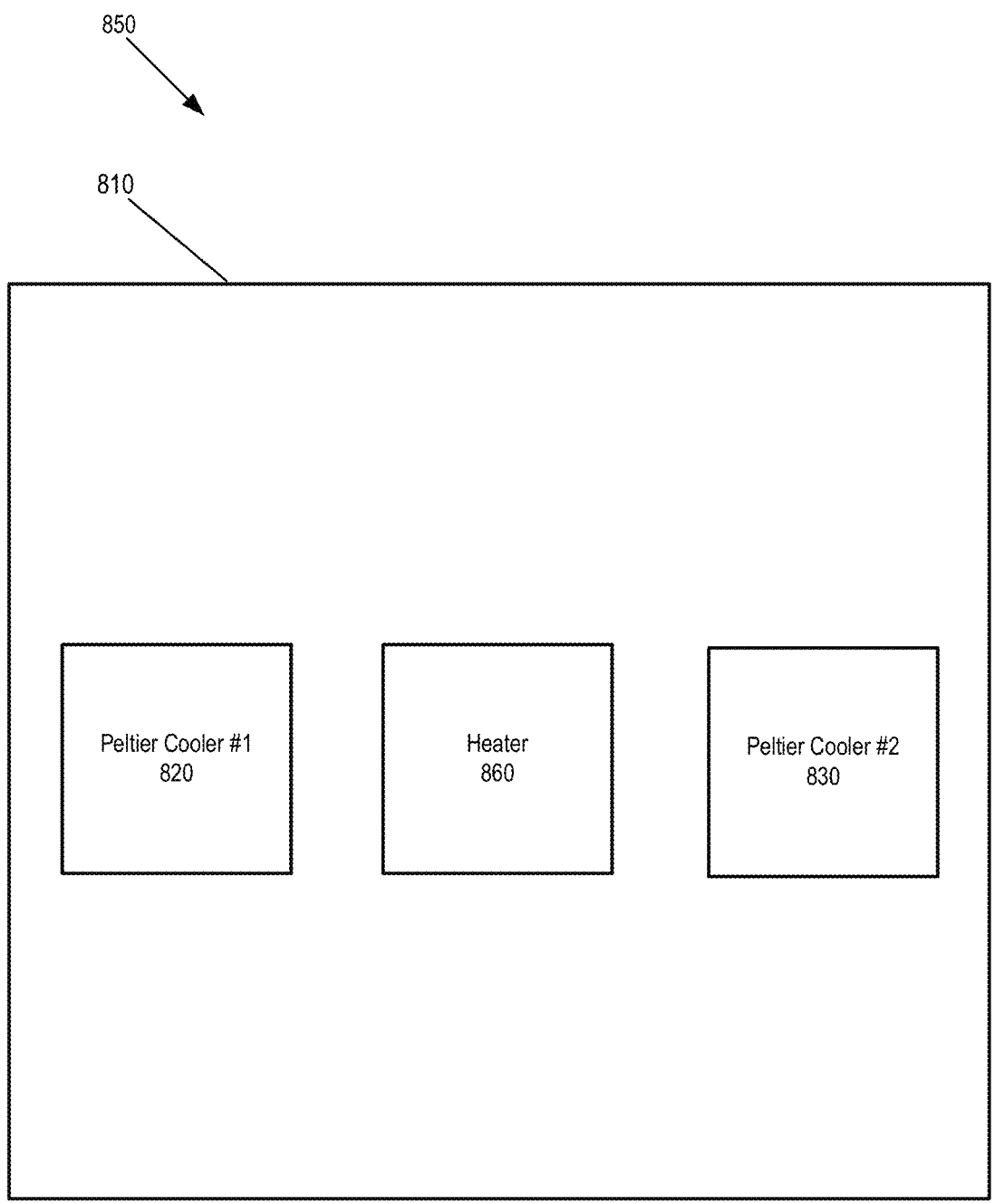
FIG. 8B illustrates the layout of multiple Peltier cooling devices interspersed with a heating device for the mobile device temperature regulating case.

FIG. 8B illustrates the layout 850 of multiple Peltier cooling devices 820, 830 interspersed with a heating device 860 for the mobile device temperature regulating case. As discussed above, the different sections of exterior surface of the mobile device may be conductively cooled via cooling devices 820, 830. Likewise, another section of the exterior surface (configured to contact the heating device 860) may be conductively heated via heating device 860. The cooling device(s) and/or heating device(s) may thus be dispersed in order to disperse the conductive heating and/or cooling of the exterior surface of the mobile device.

Thus, the Peltier cooling device may operate as a thermoelectric generator in which a voltage is applied across the device, and as a result, a difference in temperature will build up between the two sides. In operation, the Peltier cooling device has two sides, and when a DC electric current flows through the device, it brings heat from one side to the other, so that one side gets cooler while the other gets hotter. As discussed above, the hot side is attached to a heat sink, which is in turn convectively cooled by the fan.

In one implementation, the Peltier cooling device include n-type and p-type semiconductors, which are placed thermally in parallel to each other and electrically in series and then joined with a thermally conducting plate on each side. When a voltage is applied to the free ends of the two semiconductors, there is a flow of DC current across the junction of the semiconductors causing a temperature difference. The side with the cooling plate absorbs heat which is then moved to the other side of the device where the heat sink is.

Further, as shown, the mobile device temperature regulating case may be modular in design. For example, different cooling modules, which may comprise a Peltier cooling device, an associated heat sink, and associated fan, may be incorporated in the design. As another example, different heating modules, such as a film resistive heater or Peltier heating device, may be incorporated in the design. As still another example, a combination of cooling module(s) and heating module(s) may be used. The number of modules selected may be based on the type of mobile device. As one example, a tablet mobile device (such as an iPad® tablet) may have a larger surface area on its exterior surface than a smartphone mobile device (such as an iPhone® X smartphone). In that regard, the mobile device temperature regulating case for the tablet mobile device may include two or three temperature regulating modules (e.g., two or three cooling modules) whereas the mobile device temperature regulating case for the smartphone may include one temperature regulating modules (e.g., one cooling modules).

Figure 9A:
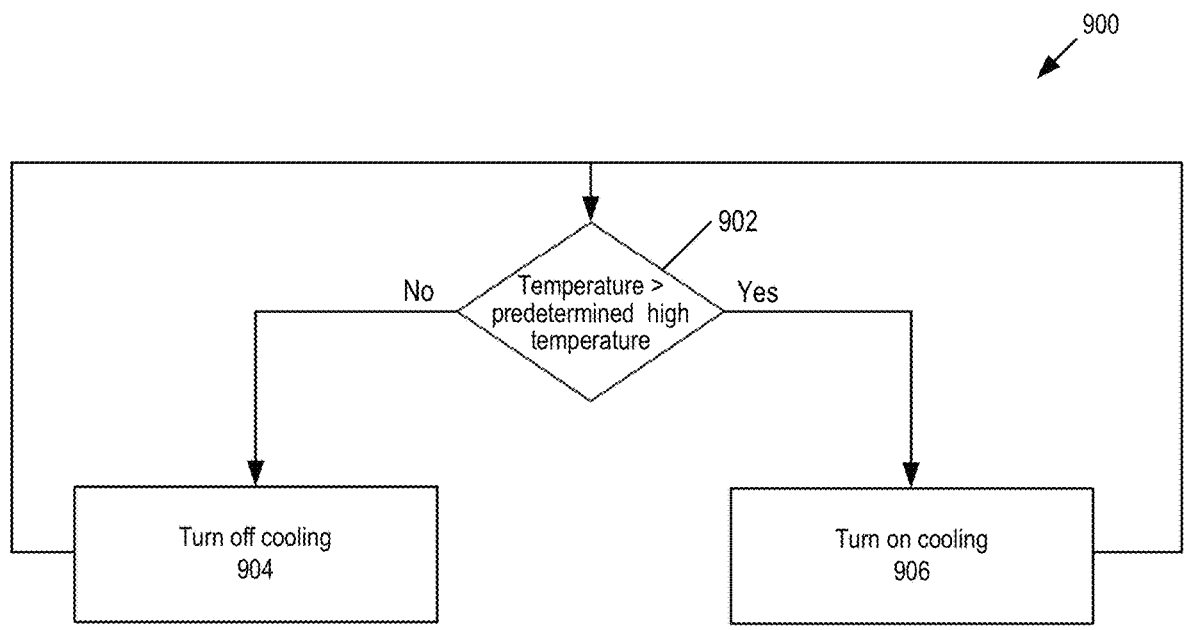
FIG. 9A illustrates a first flow diagram of logic to regulate the cooling devices of the mobile device temperature regulating case.

FIG. 9A illustrates a first flow diagram 900 of logic to regulate the cooling devices of the mobile device temperature regulating case. At 902, the controller of the mobile device temperature regulating case determines, via a temperature sensor, such as temperature sensor 613, whether the temperature of an exterior surface of the mobile device is above a predetermined high temperature. If not, at 904, the controller turns off the cooling (e.g., controls the Peltier cooling device so that it is either not activated or, if currently operating, turned off). If so, at 906, the controller turns on the cooling (e.g., controls the Peltier cooling device so that it is activated). Similarly, the controller may monitor the temperature of the mobile device in order to determine whether to activate the heaters. For example, responsive to the controller determining that the temperature is less than a predetermined low temperature, the controller may activate the heater. Further, responsive to the controller determining that the temperature is greater than a predetermined low temperature, the controller may turn off the heater.

As discussed above, multiple cooling devices and/or multiple heating devices may be used in the mobile device temperature regulating case. In such an instance, the controller may control the multiple cooling devices and/or multiple heating devices. For example, with regard to cooling, the controller may control the multiple cooling devices in unison in which all of the cooling devices are turned on or off in combination. As another example, the controller may control the multiple cooling devices individually in which the controller controls each of the cooling devices separately.

Figure 9B:
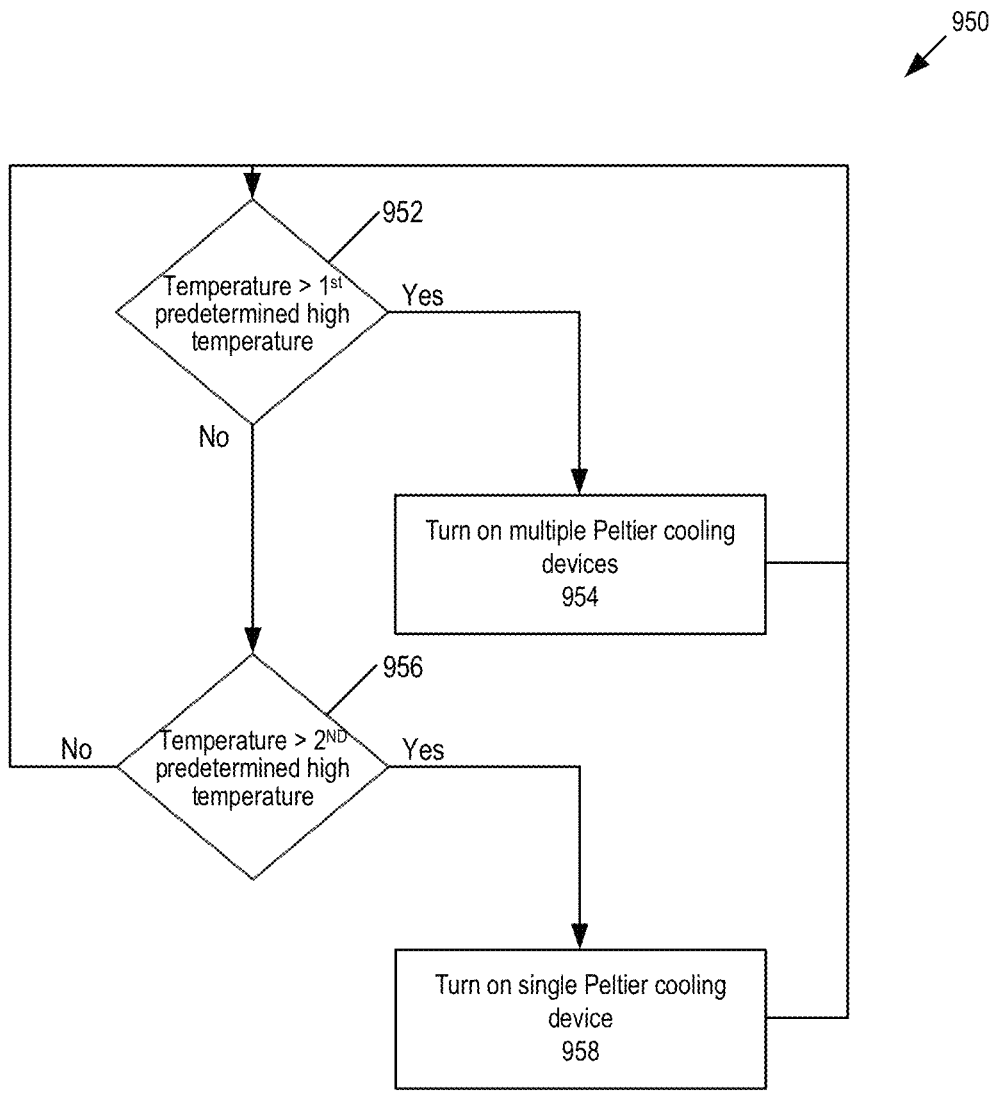
FIG. 9B illustrates a second flow diagram of logic to regulate the cooling devices of the mobile device temperature regulating case.

FIG. 9B illustrates one example of the controller controlling multiple cooling devices as illustrated in flow diagram 950. At 952, the controller determines whether the temperature is greater than a first predetermined temperature. If so, at 954, the controller turns on multiple Peltier cooling devices. If not, at 956, the controller determines whether the temperature is greater than a second predetermined temperature, which is less than the first predetermined temperature. If so, at 958, the controller turns on only a single Peltier cooling device. If not, flow diagram 950 loops back to 952.

Likewise, the controller may monitor the temperature of the mobile device in order to determine whether to activate the heaters. For example, responsive to the controller determining that the temperature is less than a first predetermined low temperature, the controller may activate multiple heaters. Further, responsive to the controller determining that the temperature is less than a second predetermined low temperature (but greater than the first predetermined low temperature), the controller may activate only one heater. Finally, responsive to the controller determining that the temperature is greater than a second predetermined low temperature, the controller may turn off the heaters.

Further, in one implementation, the fan may be turned on whenever a solid-state heat pump is turned on. Alternatively, temperature of one side of the solid-state heat pump may be monitored, such as the temperature of side 621 of solid-state heat pump 604. Responsive to the side 621 of solid-state heat pump 604 being higher than a predetermined temperature, the controller may turn the fan may be turned on. Further, responsive to the side 621 of solid-state heat pump 604 being less than the predetermined temperature, the controller may turn the fan may be turned off. For configurations with multiple fans (e.g., a fan assigned to a respective solid-state heat pump), the fans may be operated in combination (e.g., the controller turns all of the fans on or off) or may be operated individually (e.g., the controller may turn on/off individual fans responsive to determining a temperature of a side 621 of a respective solid-state heat pump 604.

Figure 10:
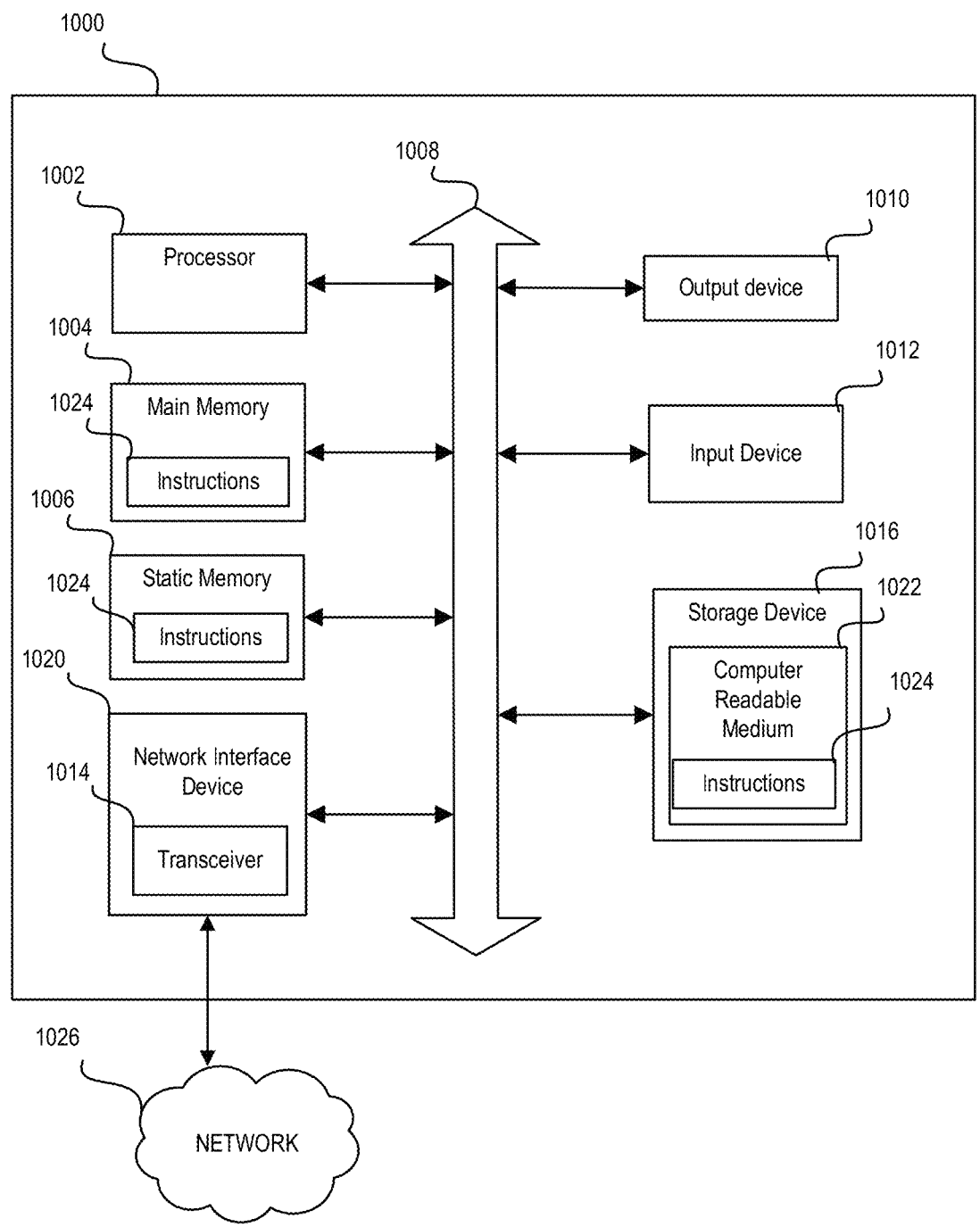
FIG. 10 illustrates a block diagram of exemplary computer architecture for a device in the exemplary system of FIG. 6A.

FIG. 10 illustrates a block diagram of exemplary computer system 1000 for the electronic devices of FIG. 6A. Computer system 1000 includes a network interface 1020 that allows communication with other computers via a network 1026. Network 1026 may be any suitable network and may support any appropriate protocol suitable for communication to computer system 1000. In an implementation, network 1026 may support wireless communications. In another implementation, network 1026 may support hardwired communications, such as a telephone line or cable. In another implementation, network 1026 may support the Ethernet IEEE (Institute of Electrical and Electronics Engineers) 802.3x specification. In another implementation, network 1026 may be the Internet and may support IP (Internet Protocol). In another implementation, network 1026 may be a LAN or a WAN. In another implementation, network 1026 may be a hotspot service provider network. In another implementation, network 1026 may be an intranet. In another implementation, network 1026 may be a GPRS (General Packet Radio Service) network. In another implementation, network 1026 may be any appropriate cellular data network or cell-based radio network technology. In another implementation, network 1026 may be an IEEE 802.11 wireless network. In still another implementation, network 1026 may be any suitable network or combination of networks. Although one network 1026 is shown in FIG. 10, network 1026 may be representative of any number of networks (of the same or different types) that may be utilized. The computer system 1000 may also include a processor 1002, a main memory 1004, a static memory 1006, an output device 1010 (e.g., a display or speaker), an input device 1012, and a storage device 1016, communicating via a bus 1008. Processor 1002 and static memory 1006 are one example of logic.

Processor 1002 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 1002 is one example of a type of controller, such as a microcontroller. In one implementation, processor 1002 executes instructions 1024 stored on one or more of the main memory 1004, static memory 1006, or storage device 1015. Alternatively, processing/memory may comprise a programmable logic device, such as a programmable logic array, a programmable field logic, a field programmable array, or the like. Processor 1002 may also include portions of the computer system 1000 that control the operation of the entire computer system 1000. Processor 1002 may also represent a type of controller that organizes data and program storage in memory and transfers data and other information between the various parts of the computer system 1000.

Processor 1002 is configured to receive input data and/or user commands through input device 1012. Input device 1012 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 1000. Input device 1012 as illustrated in FIG. 10 may be representative of any number and type of input devices.

Processor 1002 may also communicate with other computer systems via network 1026 to receive instructions 1024, where processor 1002 may control the storage of such instructions 1024 into any one or more of the main memory 1004 (e.g., random access memory (RAM)), static memory 1006 (e.g., read only memory (ROM)), or the storage device 1016. Processor 1002 may then read and execute instructions 1024 from any one or more of the main memory 1004, static memory 1006, or storage device 1016. The instructions 1024 may also be stored onto any one or more of the main memory 1004, static memory 1006, or storage device 1016 through other sources.

Although computer system 1000 is represented in FIG. 10 as a single processor 1002 and a single bus 1008, the disclosed implementations applies equally to computer systems that may have multiple processors and to computer systems that may have multiple busses with some or all performing different functions in different ways.

Storage device 1016 represents one or more mechanisms for storing data. For example, storage device 1016 may include a computer readable medium 1022 such as read-only memory (ROM), RAM, non-volatile storage media, optical storage media, flash memory devices, and/or other machine-readable media. In other implementations, any appropriate type of storage device may be used. Although only one storage device 1016 is shown, multiple storage devices and multiple types of storage devices may be present. Further, although computer system 1000 is drawn to contain the storage device 1016, it may be distributed across other computer systems that are in communication with computer system 1000, such as a server in communication with computer system 1000.

Storage device 1016 may include a controller (not shown) and a computer readable medium 1022 having instructions 1024 capable of being executed by processor 1002 to carry out functions of the control electronics circuit board 608. In another implementation, some or all of the functions are carried out via hardware in lieu of a processor-based system. In one implementation, the controller included in storage device 1016 is a web application browser, but in other implementations the controller may be a database system, a file system, an electronic mail system, a media manager, an image manager, or may include any other functions capable of accessing data items. Storage device 1016 may also contain additional software and data (not shown), for implementing described features.

Output device 1010 is configured to present information to the user. For example, output device 1010 may be a display such as a liquid crystal display (LCD), a gas or plasma-based flat-panel display, or a traditional cathode-ray tube (CRT) display or other well-known type of display in the art of computer hardware. Accordingly, in some implementations output device 1010 displays a user interface. In other implementations, output device 1010 may be a speaker configured to output audible information to the user. In still other implementations, any combination of output devices may be represented by the output device 1010.

Network interface 1020 provides the computer system 1000 with connectivity to the network 1026 through any compatible communications protocol. Network interface 1020 sends and/or receives data from the network 1026 via a wireless or wired transceiver 1014. Transceiver 1014 may be a cellular frequency, radio frequency (RF), infrared (IR) or any of a number of known wireless or wired transmission systems capable of communicating with network 1026 or other computer device having some or all of the features of computer system 1000. Bus 1008 may represent one or more busses, e.g., USB, PCI, ISA (Industry Standard Architecture), X-Bus, EISA (Extended Industry Standard Architecture), or any other appropriate bus and/or bridge (also called a bus controller). Network interface 1020 as illustrated in FIG. 10 may be representative of a single network interface card configured to communicate with one or more different data sources.

Computer system 1000 may be implemented using any suitable hardware and/or software, such as a personal computer or other electronic computing device. In addition, computer system 1000 may also be a portable computer, laptop, tablet or notebook computer, PDA, pocket computer, appliance, telephone, server computer device, or mainframe computer.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A mobile device case configured to removably connect to a mobile device, the mobile device case comprising:
   a housing;
   a solid-state heat pump positioned at least partly within the housing, the solid-state heat pump comprising a first side and a second side, the first side configured to conductively cool at least a part of an exterior surface of the mobile device;
   a fan configured to convectively cool the second side of the solid-state heat pump;
   control electronics in communication with the solid-state heat pump and the fan in order to control the cooling of the exterior surface of the mobile device and the cooling of the second side of the solid-state heat pump; and
   a temperature sensor in communication with the control electronics, the temperature sensor configured to generate a sensed temperature on at least a part of the exterior surface of the mobile device;
   wherein the first side of the solid-state heat pump is at least partly covered by a metal;
   wherein, when the mobile device case is connected to the mobile device, the metal directly contacts, via an opening in the housing, the exterior surface of the mobile device such that there is no air gap between the metal and the exterior surface of the mobile device;
   wherein a plurality of fins are attached to the second side opposite to the first side;
   wherein the fan is configured to convectively cool the second side of the solid-state heat pump by blowing air across the fins attached to the second side of the solid-state heat pump; and
   wherein the control electronics are configured to control at least one of the solid-state heat pump or the fan based on the sensed temperature from the temperature sensor without dependence on communication with the mobile device.

2. The mobile device of claim 1, wherein the second side of the solid-state heat pump is coaxial with the fan.

3. The mobile device of claim 1, wherein the solid-state heat pump comprises a Peltier cooling device.

4. The mobile device case of claim 1,
   wherein the first side of the solid-state heat pump at least partly covered by the metal is flush with a perimeter of the opening of the housing.

5. The mobile device case of claim 4,
   wherein the fan comprises a first side and a second side, the first side of the fan facing the fins; and
   further comprising a grille, the second side facing the grille.

6. The mobile device case of claim 5, wherein there is a gap between the first side of the fan and the fins; and
   wherein the housing includes holes on two opposing sides that define a duct through the gap between the first side of the fan and the fins.

7. The mobile device case of claim 1,
   wherein the control electronics are configured to control the fan based the sensed temperature from the temperature sensor.

8. The mobile device case of claim 1, wherein at least one temperature sensor is configured to sense temperature of the second side of the solid-state heat pump in order to generate the sensed temperature; and
   wherein the control electronics are configured to control the fan based the sensed temperature from the at least one temperature sensor by:
      determining whether the sensed temperature, indicative of the temperature of the second side of the solid-state heat pump, is greater than a predetermined temperature; and
      responsive to determining that the sensed temperature is greater than the predetermined temperature, turning on the fan.

9. The mobile device case of claim 1, wherein the control electronics is configured to turn on the fan responsive to activating the solid-state heat pump.

* * * * *